United States Patent
Weiner et al.

(10) Patent No.: US 6,930,669 B2
(45) Date of Patent: Aug. 16, 2005

(54) PORTABLE PERSONAL COMPUTING DEVICE WITH FULLY INTEGRATED PROJECTION DISPLAY SYSTEM

(75) Inventors: Michael L. Weiner, Webster, NY (US); John H. Coult, Chicago, IL (US)

(73) Assignee: Technology Innovations, LLC, West Henrietta, NY (US)

( * ) Notice: Subject to any disclaimer, the term of this patent is extended or adjusted under 35 U.S.C. 154(b) by 236 days.

(21) Appl. No.: 10/100,375

(22) Filed: Mar. 18, 2002

(65) Prior Publication Data

US 2003/0174120 A1 Sep. 18, 2003

(51) Int. Cl.$^7$ .............................................. G09G 5/00
(52) U.S. Cl. ................................... 345/156; 345/7
(58) Field of Search ........................ 345/5, 156, 2, 345/168, 901, 905, 1, 7, 8; 348/1, 203, 747, 168, 745; 353/28, 122, 30, 72, 74, 7, 8; 361/680, 686; 434/4, 76, 316

(56) References Cited

U.S. PATENT DOCUMENTS

| | | | | |
|---|---|---|---|---|
| 5,622,419 A | * | 4/1997 | Holder et al. | 353/119 |
| 5,803,569 A | * | 9/1998 | Ma | 353/120 |
| 5,847,748 A | * | 12/1998 | Laughlin | 725/105 |
| 6,310,662 B1 | * | 10/2001 | Sunakawa et al. | 348/747 |
| 6,473,092 B1 | * | 10/2002 | Sojourner | 345/589 |
| 6,481,851 B1 | * | 11/2002 | McNelley et al. | 353/28 |
| 6,525,750 B1 | * | 2/2003 | Knox | 345/30 |
| 6,538,642 B2 | * | 3/2003 | Tsai | 345/168 |
| 2001/0011030 A1 | | 8/2001 | Kuroda | |
| 2002/0180869 A1 | * | 12/2002 | Callison et al. | 348/203 |
| 2003/0011751 A1 | * | 1/2003 | Sakata et al. | 353/30 |

FOREIGN PATENT DOCUMENTS

| | | | |
|---|---|---|---|
| GB | 2 360 664 A | | 9/2001 |
| JP | 7-295678 | * | 6/1994 |
| JP | 10-69328 | * | 8/1996 |

* cited by examiner

Primary Examiner—Vijay Shankar
Assistant Examiner—Nitin Patel
(74) Attorney, Agent, or Firm—Basch & Nickerson, LLP; Michael J. Nickerson

(57) ABSTRACT

A fully integrated portable personal computing device includes a lid body member and a main body member. An input system inputs data and commands and a microprocessor processes the data in accordance with the commands. A display system displays information. The display system is located in the lid body member. A projection system is integrally included in the portable personal computing device for projecting the information displayed on the display system to an area remote of the portable personal computing device. The projection system can also be a peripheral plug-in device for replacing a floppy disk drive peripheral for the portable personal computing device.

100 Claims, 10 Drawing Sheets

PORTABLE PERSONAL COMPUTING DEVICE WITH FULLY INTEGRATED PROJECTION DISPLAY SYSTEM

FIELD OF THE PRESENT INVENTION

The present invention is directed to projection systems. More particularly, the present invention is directed to a projection system fully integrated into a portable personal computing device.

BACKGROUND OF THE PRESENT INVENTION

Conventionally, as illustrated in FIG. 13, media presentations have been realized by connecting a data processing system 101, such as a laptop computer, to a multi-media device 107. The data processing system 1 is connected to the multi-media device 107 via a cable 113. The multi-media device 107 includes an audio system 108 and an imaging system 106 that projects an image 109.

A multi-media presentation is stored in the data processing system 101. This multi-media presentation can be a slide presentation of images, animation, a video clip, and/or an audio clip. The desired image, video, animation or audio (informational data) is selected on the data processing system 101 through either a keyboard input device 103 or a pointing device 105, such as a mouse, touch pad, or trackball. The selected informational data is transferred from the data processing system 101 to the multi-media device 107 via cable 113 in response to commands entered via the keyboard input device 103 or the pointing device 105.

The multi-media device 107 then processes the selected informational data such audio information is reproduced by the audio system 108 and image information is reproduced by the imaging system 106. In this manner, a multi-media presentation can be realized.

However, it is noted that in these conventional devices, a data processing system operator is required to have a bulky second device to display or project the information from the data processing system 101 remotely. These bulky projection devices are not convenient for small spontaneous meetings since such projection devices are not always convenient or readily accessible. Moreover, in small office or informal meetings, these bulky projection devices are more than what is required because the need for very high quality imaging is relatively small compared to the quality needed in large or formal meetings.

Therefore, it is desirable to have a media projection system that is small and not as skewed towards high quality. More specifically, it is desirable to have a fully integrated in the portable personal computing device so that a small or informal meeting can be successfully conducted without relying upon the successful corralling of a separate bulky device for projection. Moreover, it is desirable to have a peripheral plug-in device for replacing a floppy disk drive peripheral or other replaceable peripheral for the portable personal computing device that provides projection of the information that is being displayed on a display screen of a portable personal computing device.

The present invention provides a media projection system that significantly reduces or eliminates the disadvantages associated with conventional techniques. More specifically, the present invention utilizes a media projection system that is fully integrated in the portable personal computing device or a peripheral plug-in device for replacing a floppy disk drive peripheral or other replaceable peripheral in the portable personal computing device that provides projection of the information that is being displayed on a display screen of a portable personal computing device. Also, the present invention eliminates the need for a separate bulky projection device to display information.

SUMMARY OF THE PRESENT INVENTION

One aspect of the present invention is a fully integrated portable personal computing device. The fully integrated portable personal computing device includes a main body member; an input system to input data and commands; a microprocessor; a display system to display information; and a projection system to project the information displayed on the display system to an area remote of the portable personal computing device.

Another aspect of the present invention is a fully integrated portable personal computing device. The portable personal computing device includes a lid body member; a main body member; an input system to input data and commands; a microprocessor; a reflective display system to display information; and a projection system to project information onto the reflective display system when the lid body member is in a first position and to project information to an area remote of the portable personal computing device when the lid body member is in a second position.

A further aspect of the present invention is a compact integral plug-in device for a portable personal computing device having an integrated display system. The compact integral plug-in device includes a projection system to project the information displayed on the integrated display system to an area remote of the portable personal computing device. The projection system includes a port to interface directly with the portable personal computing device having the integrated display system, a light source, a subscan deflection system, and a main scan deflection system.

A still further aspect of the present invention is a compact integral plug-in device for a portable personal computing device having an integrated display system. The compact integral plug-in device includes a projection system to project the information displayed on the integrated display system to an area remote of the portable personal computing device. The projection system includes a port to interface directly with the portable personal computing device having the integrated display system, a light source, and an optical micro electromechanical system to provide two-dimensional deflection.

BRIEF DESCRIPTION OF THE DRAWINGS

The present invention may take form in various components and arrangements of components, and in various steps and arrangements of steps. The drawings are only for purposes of illustrating a preferred embodiment or embodiments and are not to be construed as limiting the present invention, wherein.

DETAILED DESCRIPTION OF THE PRESENT INVENTION

As discussed above, a conventional projection system for a portable personal computing device; such as a laptop, tablet computer, or a personal digital assistant; a bulky device that is connected to a display terminal output port of a laptop. The conventional projection system provides a high quality projection of the information being displayed; however, in small informal meetings such high quality displays are not always required. Moreover, most companies do not have a conventional projection system for each employee, and thus, many times these devices are unable for the small informal meeting. Thus, an alternative to the conventional projection systems is desirable for the small informal meeting environment.

Figure 1:
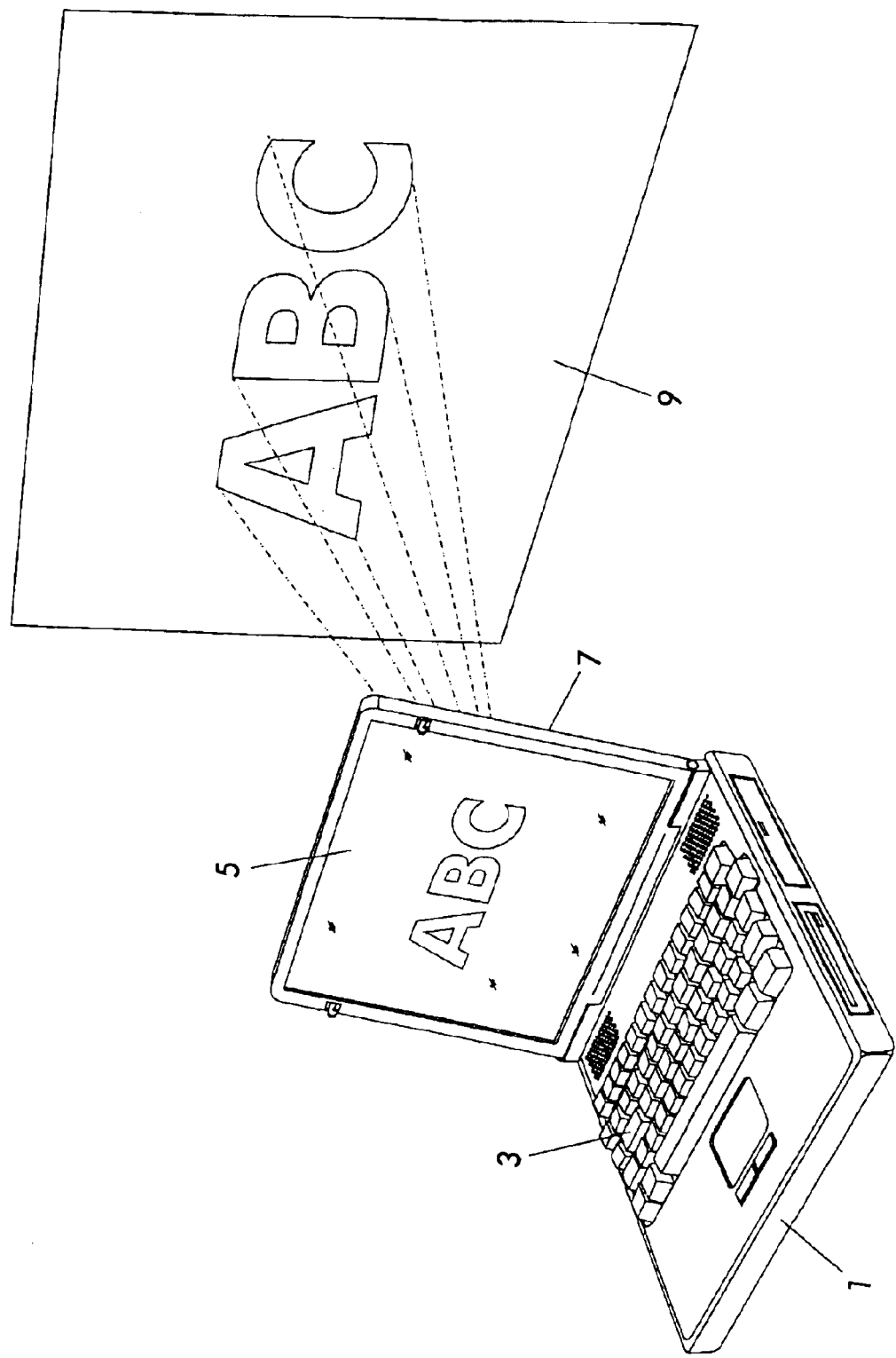
FIG. 1 is a graphical overview of one embodiment according to the concepts of the present invention.

As illustrated in FIG. 1, the present invention provides such an alternative by providing a small projection system fully integrated in the portable personal computing device. In the embodiment illustrated in FIG. 1, a portable personal computing device includes a main body member 1 and a lid body member 7. In this embodiment, the portable personal computing device is a laptop computer; however, the concepts are readily applicable to portable personal computing devices such as tablet computers and personal digital assistants, etc.

In a typical configuration, the portable personal computing device includes the processor and most of the circuitry in the main body member 1. Moreover, the main body member 1 includes a keyboard 3 and other input areas, control keys, and/or pointing device activation areas. The lid body member 7 includes a conventional display screen 5. The lid body member 7 may also include other input areas, control keys, and/or pointing device activation areas.

On a backside of the lid body member 7 of FIG. 1 (not shown), an exit member for the integrated projection system is located. This configuration enables an operator of the portable personal computing device to display the information being displayed on the display screen 5 remotely on a screen of wall 9. In such a manner, the information is projected for others to view during a small informal meeting.

Figure 2:
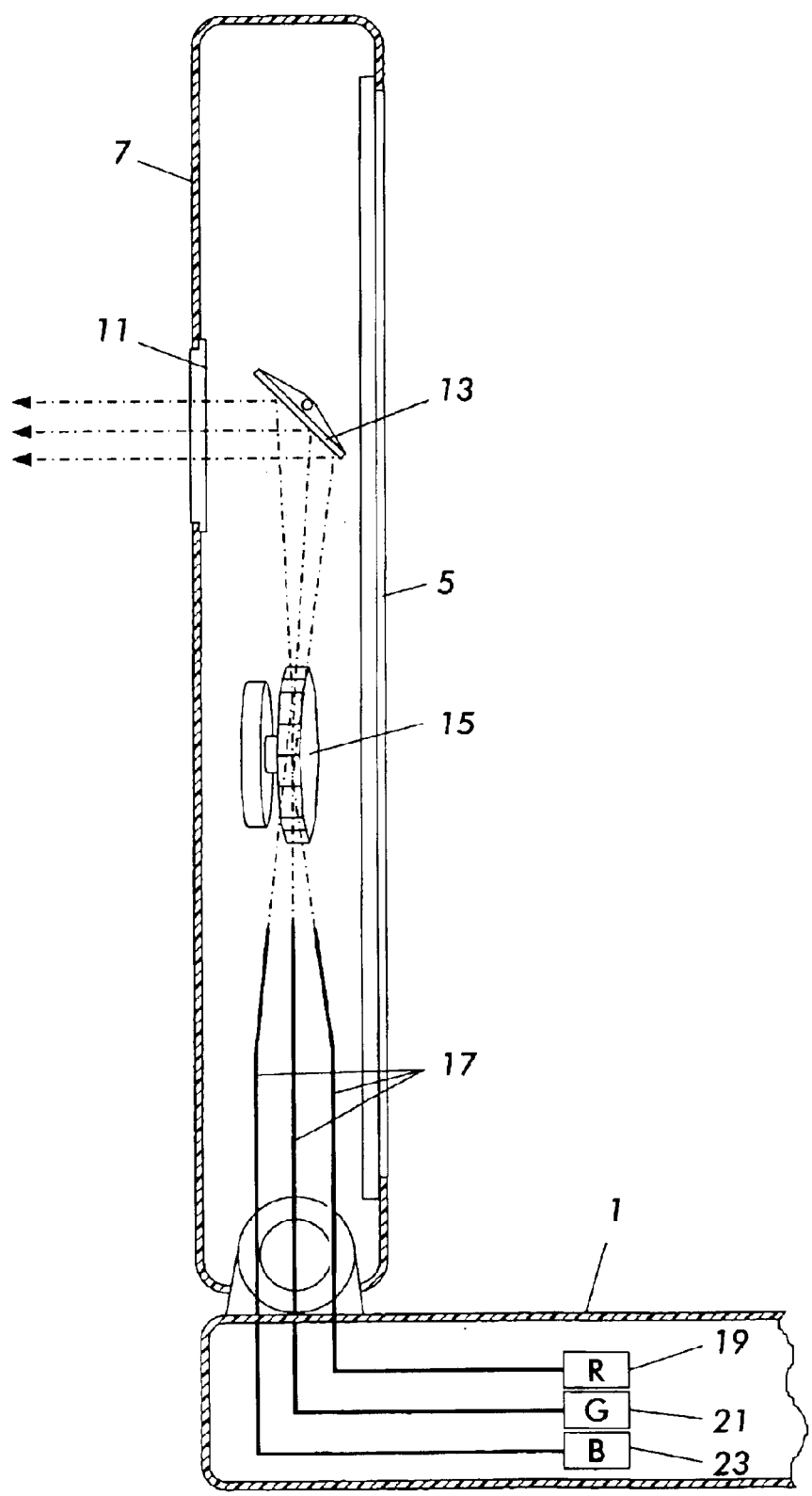
FIG. 2 is a detailed view of a projection system according to one embodiment of the present invention.

FIG. 2 provides a side view of a more detailed illustration of the projection system of the present invention. As illustrated in FIG. 2, the projection system of this embodiment includes three laser sources (19, 21 & 23) to provide three colored light sources, namely red, green, and blue ("RGB"). In FIG. 2, the light sources (19, 21 & 23) are located in the main body member 1 of the portable personal computing device; however, these light sources (19, 21 & 23) may be located in the lid body member 7 of the portable personal computing device.

RGB light is communicated to a subscan deflection device 15 via a bundle of fiber optics 17. The fiber optic bundle 17 may include one fiber optic cable per color or may include a plurality of fiber optic cables per color depending upon how much information is to be conveyed to the subscan deflection device 15 during a single clock period.

In a preferred embodiment, the subscan deflection device 15 is a high speed rotating polygon mirror; however, the subscan deflection device 15 may be any optic, acoustic-optic, electro-optic, or optical micro electromechanical system ("MEMS"), or included in the laser device so that deflection of the RGB light is provided to realize subscanning of the image to be displayed. In this specification, subscanning refers to the generation of individual image pixels along a single scanline. Subscan can also be referred to as electronic scan or fastscan.

As shown in FIG. 2 upon leaving the subscan deflection device 15, the RGB light travels to a main scan deflection device 13. The main scan deflection device 13 reflects the RGB light through a window device 11 to produce a scanline of the projected image.

In one embodiment, the main scan deflection device 13 is a galvanometer mirror that rotates on an axis to produce the scanlines of the image to be projected. In another embodiment, the main scan deflection device 13 is a conventional optical MEMS. In this specification, main scanning refers to the generation of individual scanlines or group of scanlines. Main scan can also be referred to as mechanical scan or slowscan.

It is further noted that a conventional optical MEMS could replace both the subscan deflection device 15 and the main scan deflection device 13 to provide two-dimensional scanning on a pixel-by-pixel basis by independent activation of the micro mirrors in the conventional optical MEMS.

Moreover, the window device 11 may include either a manual focus device or an automatic focus device to focus the image upon the wall or screen.

Figure 3:
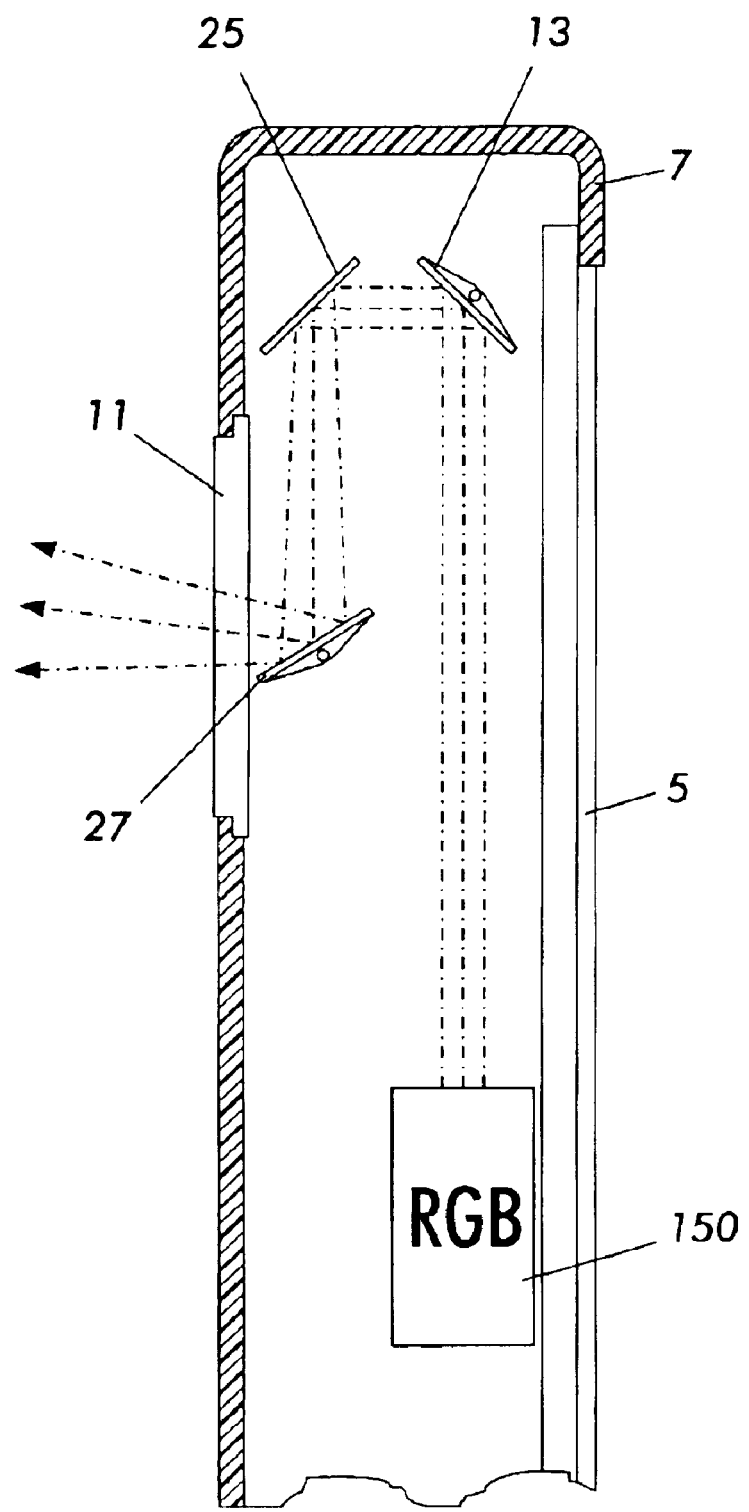
FIG. 3 is a further detailed view of a projection system according to one embodiment of the present invention.

FIG. 3 illustrates a side view of another embodiment of the projection system illustrated in FIG. 2. In this embodiment, a vertical shifting device 27 is included to enable the user of the portable personal computing device to shift the position of the projected image vertically on the screen or wall. As illustrated, RGB light from a subscan deflection device 150 is reflected by a main scan deflection device 13 to a mirror 25 that directs the RGB light to vertical shifting device 27. The vertical shifting device 27 directs the RGB light through a window device 11 to produce a projected image upon the screen or wall. The vertical shifting device 27 may be an electrically driven galvanometer mirror or a manually (mechanically) driven mirror that rotates on an axis to shift the position of the projected image vertically on the screen or wall. As before, the window device 11 may include either a manual focus device or an automatic focus device to focus the image upon the wall or screen.

With respect to FIG. 3, the vertical shifting device may be realized by a conventional optical MEMS. As noted before, a conventional optical MEMS can replace both the subscan deflection device 15 and the main scan deflection device 13 to provide two-dimensional scanning on a pixel-by-pixel basis by independent activation of the micro mirrors in the conventional optical MEMS. Moreover, the micro mirrors of the conventional optical MEMS can be tuned by the user to deflect at a certain angle so as to provide vertical shifting of the image.

Figure 4:
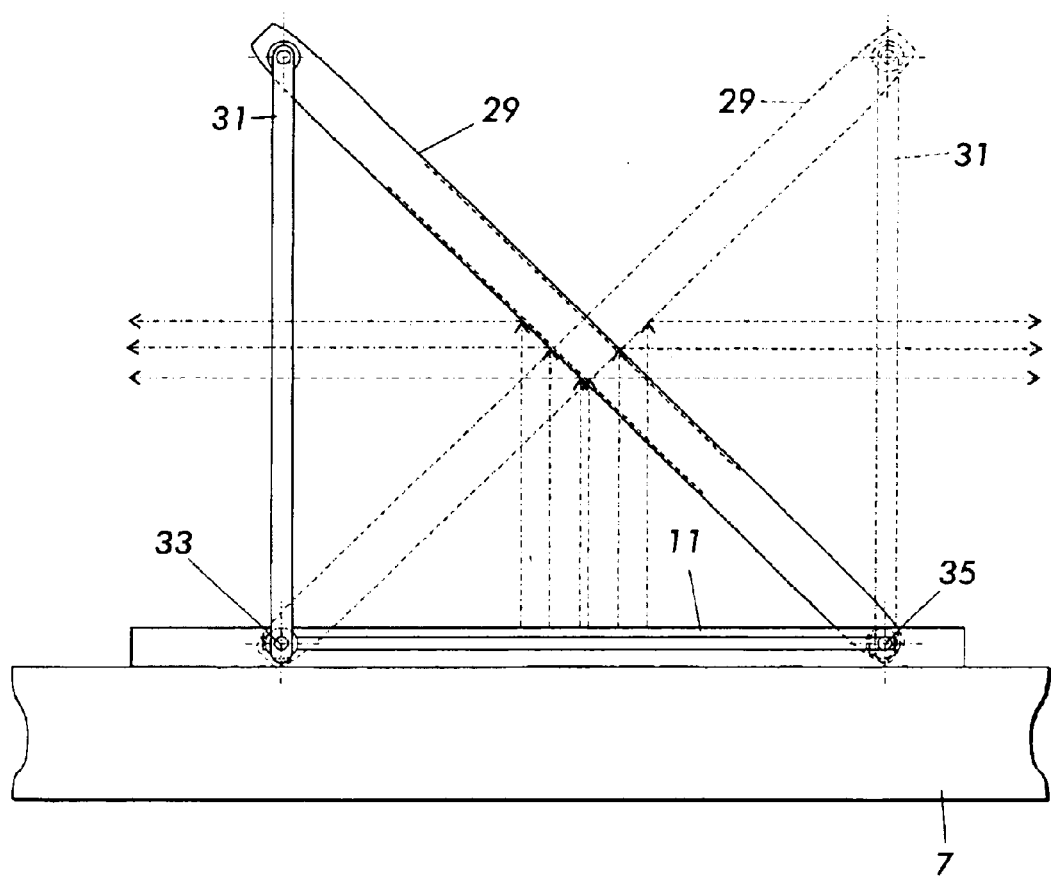
FIG. 4 is a detailed view of a projection system cover and horizontal shift device according to one embodiment of the present invention.

FIG. 4 illustrates a view from a top of the lid body member 7 of a further embodiment of the projection system illustrated in FIGS. 2 and 3. In this embodiment, a horizontal shifting device 29 is included to enable the user of the portable personal computing device to shift the position of the projected image horizontally to be displayed on a screen or wall that is substantially perpendicular to a line of projection of FIGS. 2 and 3. As illustrated in FIG. 4, RGB light from a main scan deflection device 13 or a vertical shifting device 27 is reflected by the horizontal shifting device 29 is included to enable the user of the portable personal computing device to shift the position of the projected image horizontally. The horizontal shifting device 29 a mirror for reflection, attachment sites 33 and 35 to enable the horizontal shifting device 29 to be configured to shift the image horizontally in either direction as shown by the dotted lines. The attachment sites 33 and 35 may be simple snap sites to facilitate attachment and easy removal. The horizontal shifting device 29 further includes telescopic poles 31 to further facilitate the horizontal shifting of the projected image.

In a still further embodiment (not shown) of the projection system of FIGS. 2, 3 & 4, the light sources (19, 21 & 23), fiber optic bundle 17, subscan deflection device 15, main scan deflection device 13, and window device 11 are located in the main body member 1 of the portable personal computing device. In this embodiment, the image is projected while the lid body member 7 is closed down upon the main body member 1. The lid body member 7 would include a window area corresponding to and in alignment with the window device in the main body member 1. The lid body member 7 would include a cover over the window area similar to the cover apparatus illustrated in FIG. 4. The cover would include a combination of fixed and/or movable mirrors that would enable to direct the RGB light coming from the window area in a direction perpendicular to the surface of the lid body member 7 to a direction that is between 0° and 90° with respect to the surface of the lid body member 7.

Figure 5:
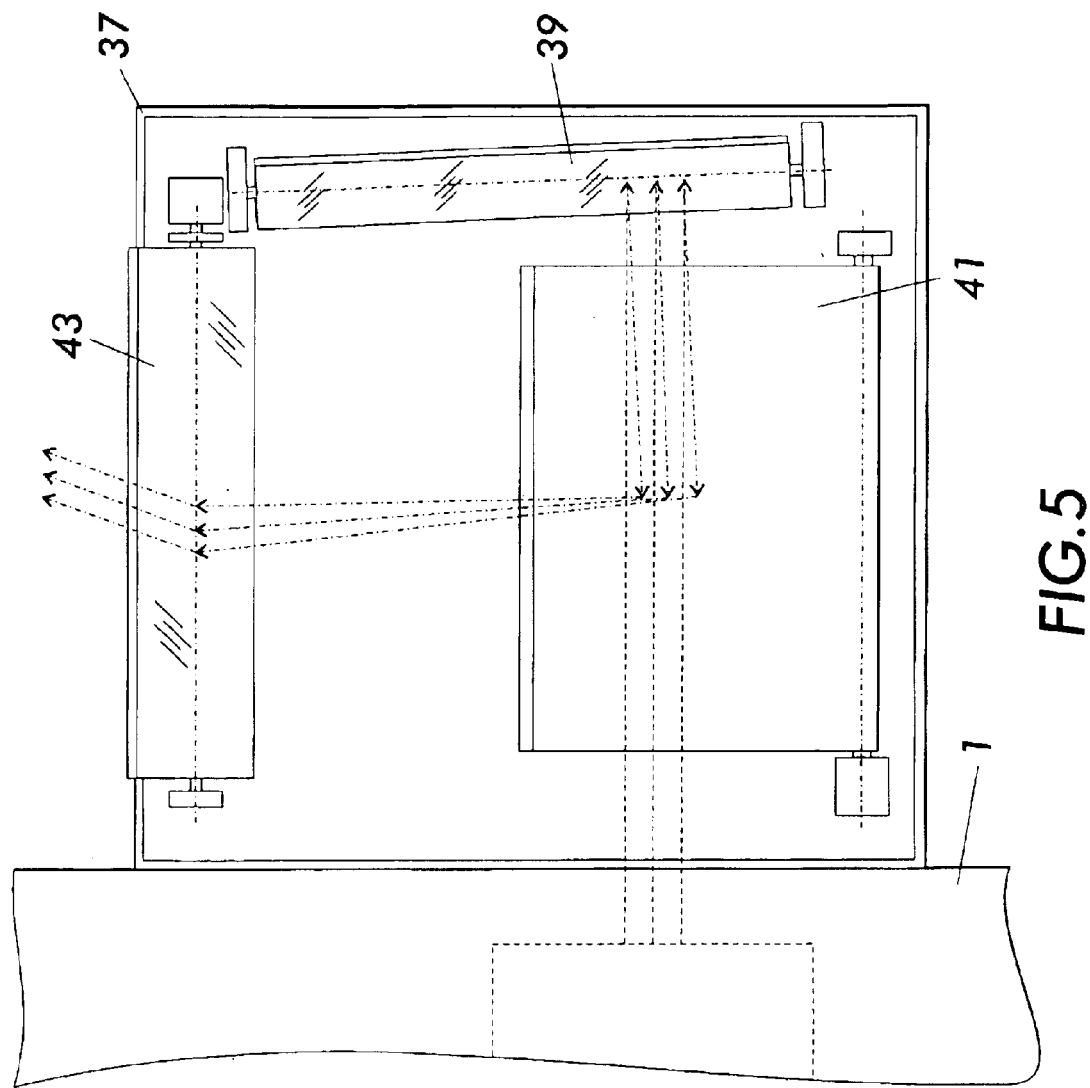
FIG. 5 is a detailed view of a projection system according to another embodiment of the present invention.

FIG. 5 illustrates a top view of another embodiment of the projection system. In this embodiment, the light sources (19, 21 & 23), fiber optic bundle 17, and subscan deflection device 15 are located in the main body member 1 of the portable personal computing device. A projection platform 37 provides support for a main scan deflection device 39, a mirror 41, and a vertical shift device 43. The mirror 41 folds out from the projection platform 37 when the projection system is engaged. For storage purposes, the mirror 41 folds down upon the projection platform 37, and the projection platform 37, with all its components, is slid manually or mechanically into a plug-in peripheral device bay of the portable personal computing device. In this embodiment, as noted before, either the subscan deflection device 15, the main scan deflection device 39, the vertical shift device 43, sub-combination thereof, or combination thereof can be realized by a conventional optical MEMS to provide one-dimensional or two-dimensional scanning on a pixel by pixel basis by independent activation of the micro mirrors in the conventional optical MEMS. Moreover, the micro mirrors of the conventional optical MEMS can be tuned by the user to deflect at a certain angle so as to provide vertical shifting of the image.

Figure 6:
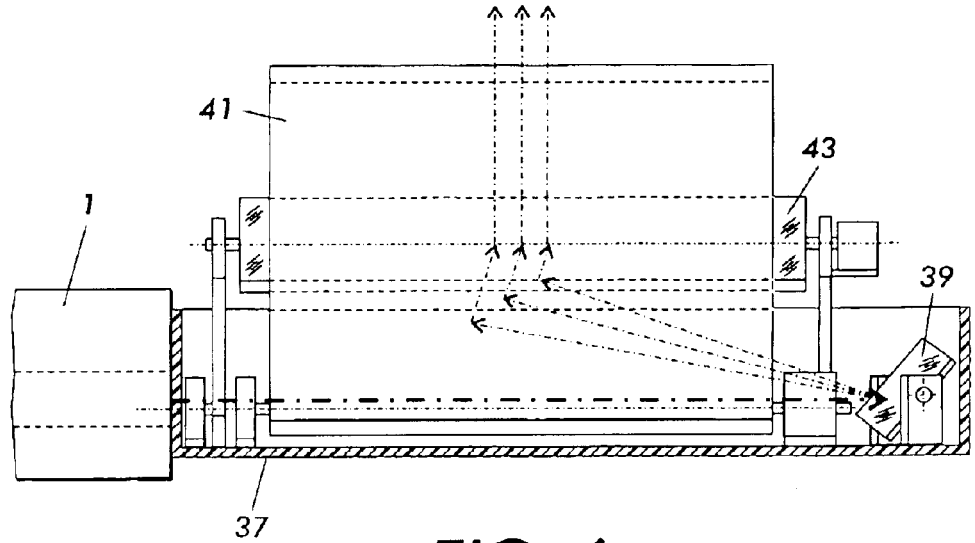
FIG. 6 is a further detailed view of a projection system according to another embodiment of the present invention.

FIG. 6 illustrates another view of the embodiment illustrated in FIG. 5. In this illustration, the RGB light leaves the main body member 1 of the portable personal computing device in a direction perpendicular to a side surface of the main body member 1. The RGB light is reflected by the main scan deflection device 39 to a mirror 41. The RGB light is then reflected by the vertical shift device 43, which is located in the projection platform 37 or could be elevated above the projection platform 37 by a lift or telescopic device, to a screen or wall in front of the user of the portable personal computing device. The vertical shift device 43 may be an electrically driven galvanometer mirror or a manually (mechanically) driven mirror that rotates on an axis to shift the position of the projected image vertically on the screen or wall.

It is noted that the mirror 41 and the vertical shift device 43 can be re-configured to have the image projected behind or to the side of the user of the portable personal computing device. Any focusing device for this embodiment could be located between the mirror 41 and the vertical shift device 43.

Figure 7:
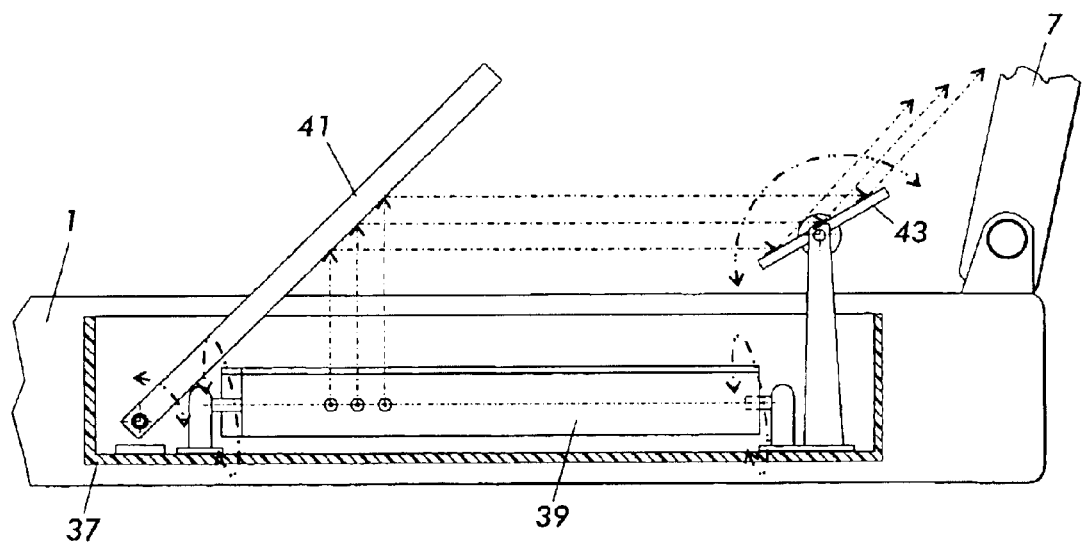
FIG. 7 is a further detailed view of a projection system according to another embodiment of the present invention.

FIG. 7 illustrates a further view of the embodiment illustrated in FIG. 5. In this illustration, the RGB light leaves (coming out from the paper in the drawing) the main body member 1 of the portable personal computing device in a direction perpendicular to a side surface of the main body member 1. The RGB light is reflected by the main scan deflection device 39 to a mirror 41. The RGB light is then reflected by the vertical shift device 43, which is located in the projection platform 37 or could be elevated above the projection platform 37 by a lift or telescopic device, to a screen or wall in front of the user of the portable personal computing device. The vertical shift device 43 may be an electrically driven galvanometer mirror or a manually (mechanically) driven mirror that rotates on an axis to shift the position of the projected image vertically on the screen or wall.

It is noted that the mirror 41 and the vertical shift device 43 can be re-configured to have the image projected behind or to the side of the user of the portable personal computing device. Any focusing device for this embodiment could be located between the mirror 41 and the vertical shift device 43.

Figure 8:
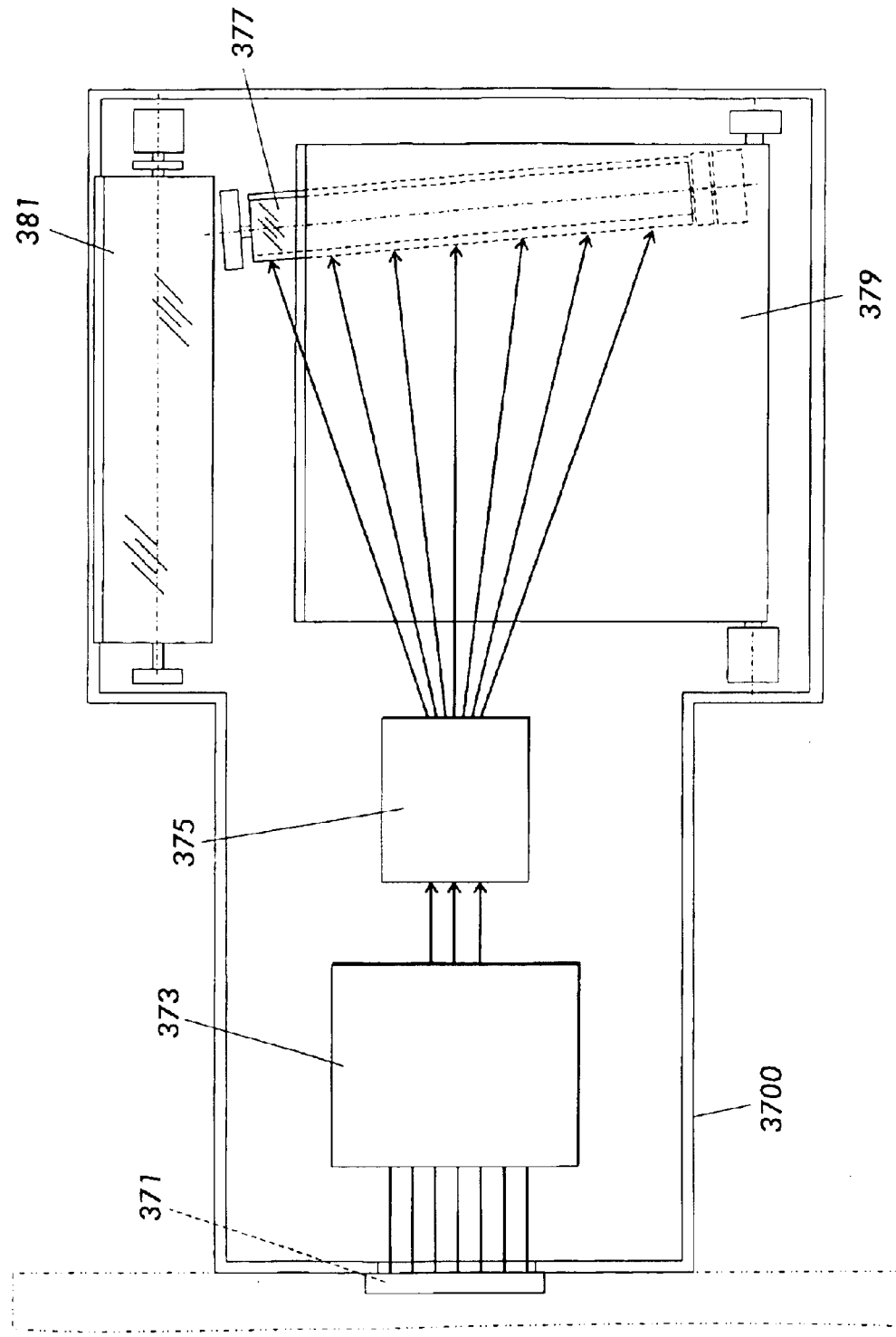
FIG. 8 is a detailed view of a projection system according to a further embodiment of the present invention.

FIG. 8 illustrates a compact integral plug-in device 370 for replacing a floppy disk drive peripheral or other peripheral device for a portable personal computing device having an integrated display system or for connecting directly, without requiring external cables or wires, to the portable personal computing device having an integrated display system through a parallel port, a serial port, a display port, a game port, a universal serial bus port, a PS/1 port, a 10 BaseT/100 BaseTX RJ-45 port, a RJ11/14 port, a video RCA port, or a video/audio RCA port of the portable personal computing device having an integrated display system.

In this embodiment, the compact integral plug-in device 370 includes a connection port 371 for providing image data and power to the projection system of the compact integral plug-in device 370. As noted above this connection port is configured to plug directly, without the use of external cables or wires, into a parallel port, a serial port, a display port, a game port, a universal serial bus port, a PS/1 port, a 10 BaseT/100 BaseTX RJ-45 port, a RJ11/14 port, a video RCA port, a video/audio RCA port or a removable peripheral bay (such as a floppy disk drive bay, CD-ROM bay, etc.) port of the portable personal computing device having an integrated display system. The plug-in device 370 further includes a light source 373, preferably a three-color source producing red, green, and blue light. This light source 373 may include a laser or plurality of lasers. Light, preferably RGB light, from the light source 373 is directed to a subscan deflection device 375.

In a preferred embodiment, the subscan deflection device 375 is a high speed rotating polygon mirror; however, the subscan deflection device 375 may be any optic, acoustic-optic, or electro-optic device that provides deflection of the RGB light to realize subscanning of the image to be displayed.

RGB light from the subscan deflection device 375 is reflected by a main scan deflection device 377. In a preferred embodiment, the main scan deflection device 377 is a galvanometer mirror that rotates on an axis to produce the scanlines of the image to be projected.

From the main scan deflection device 377, RGB light is reflected by mirror 379 to a vertical shift device 381 from which the RGB light is projected onto a wall or screen in front of, in back of, or to the side of the user of the portable personal computing device, depending upon the physical configuration of mirror 379 and vertical shift device 381. In FIG. 8, the image can be projected to a wall or screen in front or to the side of the user of the portable personal computing device.

The vertical shift device 381 may be located in the plug-in device 370 or could be elevated above the plug-in device 370 by a lift or telescopic device. The vertical shift device 381 may be an electrically driven galvanometer mirror or a manually (mechanically) driven mirror that rotates on an axis to shift the position of the projected image vertically on the screen or wall. It is noted that any focusing device for this embodiment could be located between the mirror 379 and the vertical shift device 381.

In this embodiment, as noted before, either the subscan deflection device 375, the main scan deflection device 377, the vertical shift device 381, sub-combination thereof, or combination thereof can be realized by a conventional optical MEMS to provide one-dimensional or two-dimensional scanning on a pixel by pixel basis by independent activation of the micro mirrors in the conventional optical MEMS. Moreover, the micro mirrors of the conventional optical MEMS can be tuned by the user to deflect at a certain angle so as to provide vertical shifting of the image.

Figure 9:
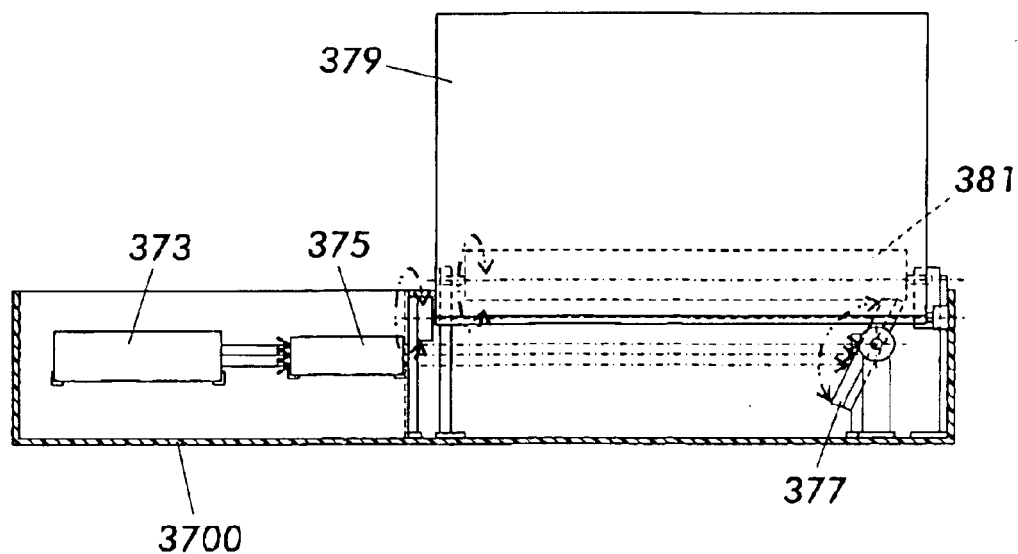
FIG. 9 is a detailed view of a projection system according to a fourth embodiment of the present invention.

FIG. 9 illustrates another plug-in device embodiment of the present invention. In this illustration, the RGB light is generated by light source 373 and deflected by subscan deflection device 375 so that the RGB light leaves the main body member 1 of the portable personal computing device in a direction between 10° to 170° to a side surface of a main body member 1. The RGB light is reflected by the main scan deflection device 377 to a mirror 379. The RGB light is then reflected by the vertical shift device 381, which is located in the peripheral plug-in device 3700 or could be elevated above the peripheral plug-in device 3700 by a lift or telescopic device, to a screen or wall in front of the user of the portable personal computing device. The vertical shift device 381 may be an electrically driven galvanometer mirror or a manually (mechanically) driven mirror that rotates on an axis to shift the position of the projected image vertically on the screen or wall. It is noted that the mirror 379 and the vertical shift device 381 can be re-configured to have the image projected behind or to the side of the user of the portable personal computing device.

Figure 10:
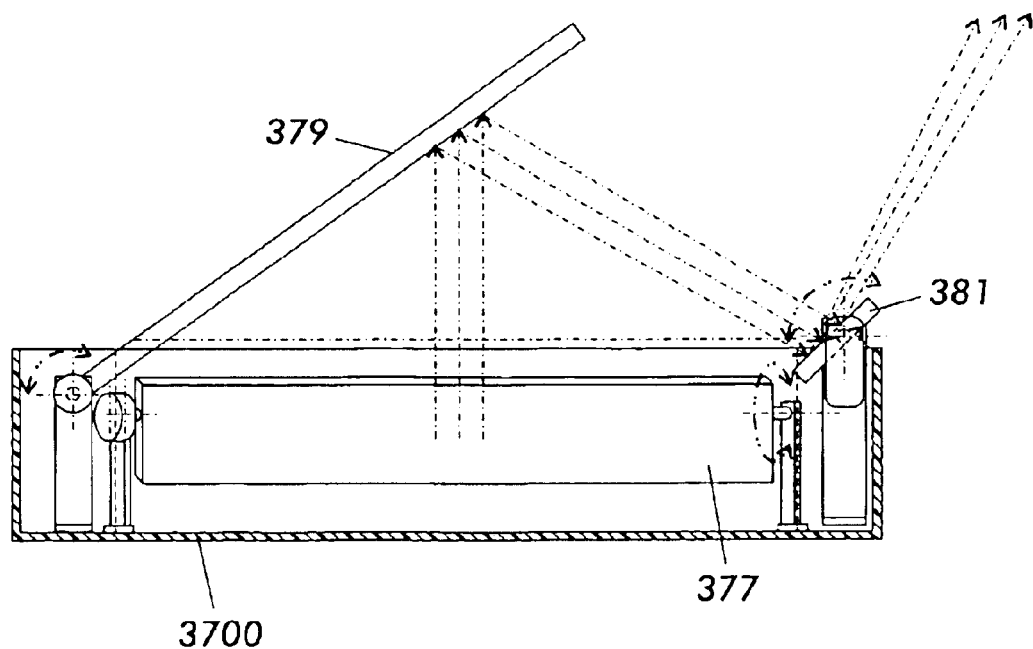
FIG. 10 is a further detailed view of the projection system illustrated in FIG. 9.

FIG. 10 illustrates another view of the embodiment illustrated in FIG. 9. In FIG. 10, the RGB light leaves (coming out from the paper in the drawing) a main body member of the portable personal computing device in a direction perpendicular to a side surface of the main body member. The RGB light is reflected by the main scan deflection device 377 to a mirror 379. The RGB light is then reflected by the vertical shift device 381, which is located in the plug-in device 3700 or could be elevated above the plug-in device 3700 by a lift or telescopic device, to a screen or wall in front of the user of the portable personal computing device. The vertical shift device 381 may be an electrically driven galvanometer mirror or a manually (mechanically) driven mirror that rotates on an axis to shift the position of the projected image vertically on the screen or wall. It is noted that the mirror 379 and the vertical shift device 381 can be re-configured to have the image projected behind or to the side of the user of the portable personal computing device.

Figure 11:
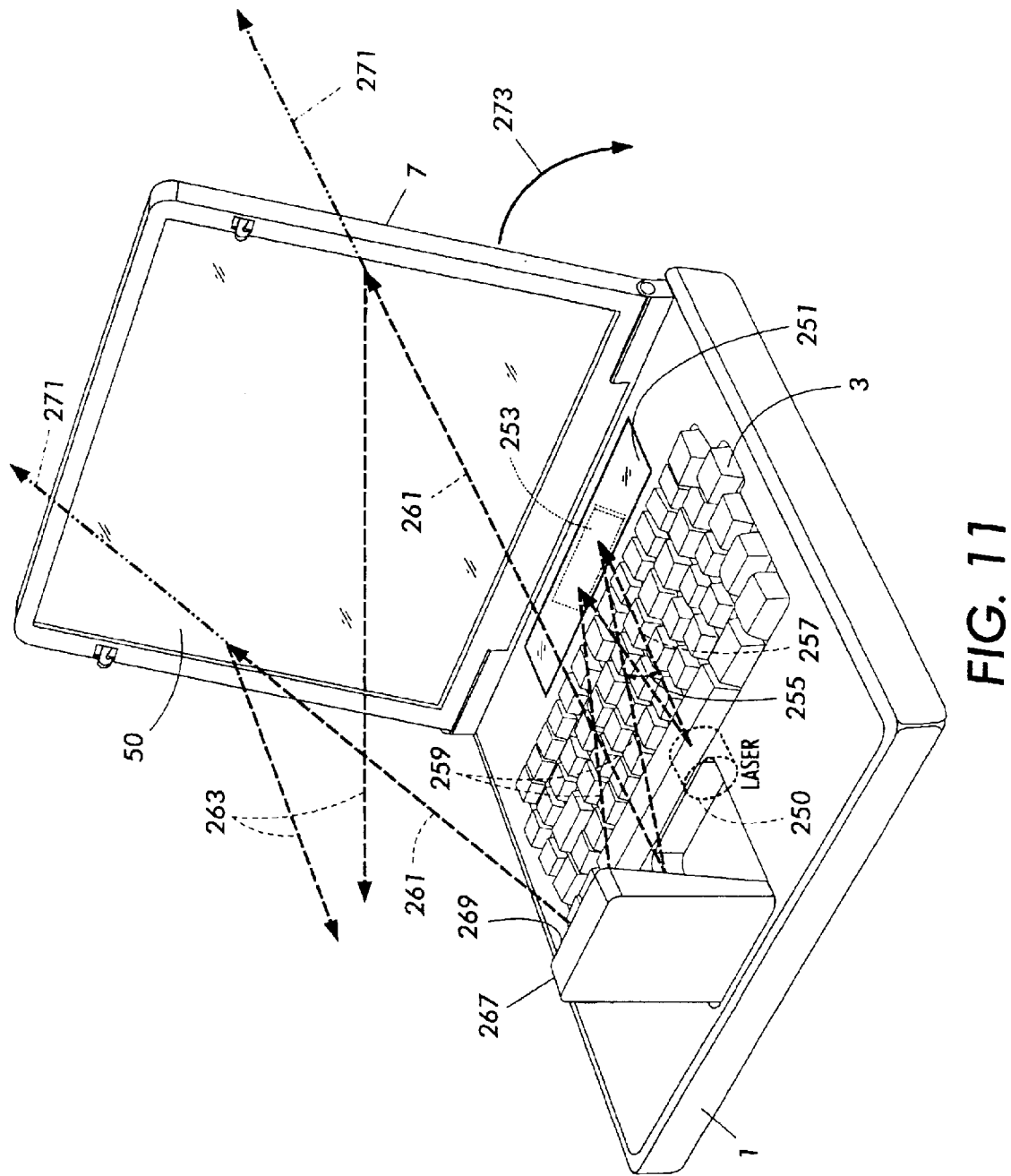
FIG. 11 is a detailed view of a projection system according to a fifth embodiment of the present invention.

FIG. 11 illustrates a further embodiment of the present invention. In FIG. 11, a portable personal computing device includes a main body member 1 and a lid body member 7 that is rotatable from a closed position to an upright position as shown in FIG. 11 and further rotatable 273 to a fully open position such that the lid body member 7 is co-planar with the main body member 1. The portable personal computing device further includes a keyboard 3 located on the main body member 1 (the keyboard 3 may also include a pointing device) and a reflective display 50 located on the lid body member 7.

A light source 250, preferably a laser light source, provides light 257 that represents information to be displayed or conveyed to the user. The light 257 from light source 250 is directed to a reflection device 253. Light 259 from the reflection device 253 is reflected at an angle 255 through a window portion 251 to pop-up reflection device 267 that includes a reflection member 269. The pop-up reflection device 267 is a simple device that is located between an edge of the main body member 1 and the keyboard. It simply pops up when the lid body member 7 is opened and the portable personal computing device is operational. The user can engage the pop-up reflection device 267 manually, or the portable personal computing device upon power-up can position the pop-up reflection device 267 automatically.

The reflected light 259 from reflection device 253 is reflected at angle 255 so that the reflected light 259 will not interfere with the user's hands during manipulation of the keyboard nor be affected by parallax. From pop-up reflection device 267, light 261 is directed to a reflective display device 50 when the lid body member 7 is in an upright or first position. Light 263 is reflected from reflective display device 50, when the lid body member 7 is in an upright or first position, so that the user can perceive the information. If the lid body member 7 is not in an upright or first position, but has been rotated further 273 to a fully open position or second position so that the lid body member 7 is substantially co-planar with the main body member 1; light 261 from pop-up reflection device 267 can be projected onto a wall or screen at a location remote from the portable personal computing device.

Light 257 from the light source 250 may be simple modulated light without any subscanning or main scanning deflection properties. If light 257 from the light source 250 is simple modulated light without any subscanning or main scanning deflection properties, the reflection device 253 may provide subscanning deflection properties to light 257 through either a rotating polygon mirror, a galvanometer mirror, or an optical MEMS device such that light 259 becomes subscanned modulated light. Thereafter, pop-up reflection device 267 provides main scanning deflection properties to light 259 through either a galvanometer mirror or an optical MEMS device such that light 261 becomes two-dimensionally scanned modulated light. It is noted that the subscanning and main scanning deflection properties can be applied in either order.

On the other hand, if light 257 from the light source 250 is simple modulated light without any subscanning or main scanning deflection properties, the reflection device 253 may provide both subscanning and main scanning deflection properties to light 257 through an optical MEMS device such that light 259 becomes two-dimensionally scanned modulated light. Thereafter, pop-up reflection device 267 provides simple reflection and possibly vertical shifting of the two-dimensionally scanned modulated light 259.

Furthermore, if light 257 from the light source 250 is simple modulated light without any subscanning or main scanning deflection properties, the reflection device 253 may provide simple reflection of the simple modulated light 257 to pop-up reflection device 267. Thereafter, pop-up reflection device 267 provides both subscanning and main scanning deflection properties to light 259 through an optical MEMS device such that light 261 becomes two-dimensionally scanned modulated light.

Figure 12:
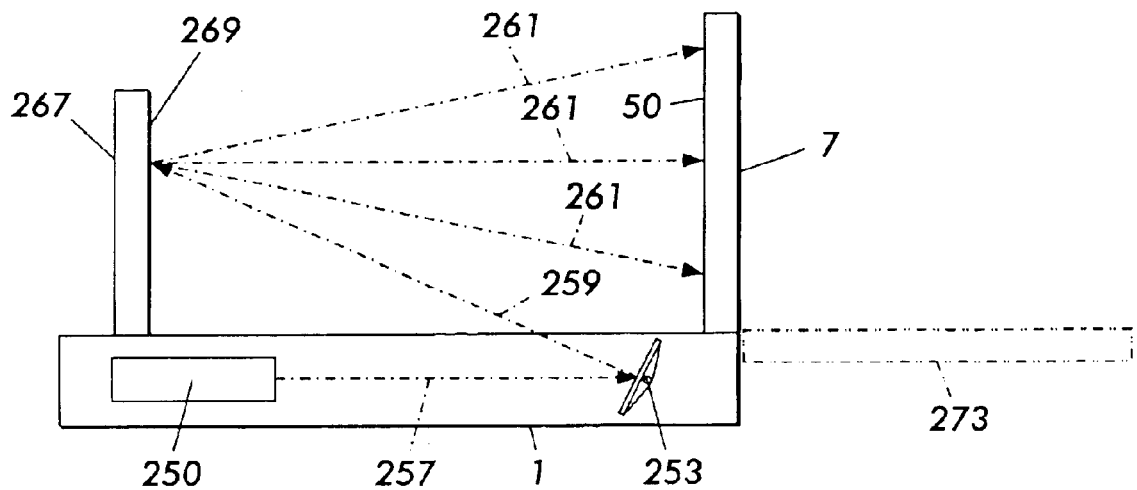
FIG. 12 is a block diagram of a side view of the embodiment illustrated in FIG. 11.
Figure 13:
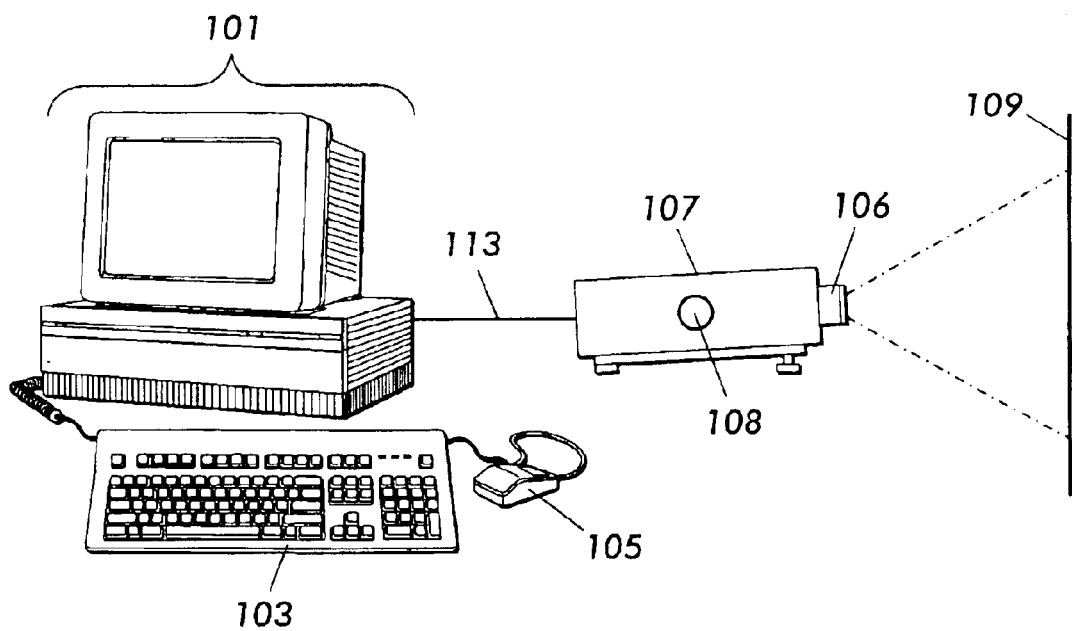
FIG. 13 is a graphical representation of a prior art projection system.

FIG. 12 illustrates a block diagram of a side view of the embodiment illustrated in FIG. 11. In FIG. 12, a portable personal computing device includes a main body member 1 and a lid body member 7 that is rotatable from a closed position to an upright position as shown in FIG. 12 and further rotatable 273 to a fully open position such that the lid body member 7 is co-planar with the main body member 1. The portable personal computing device further includes a keyboard (not shown) located on the main body member 1 (the keyboard may also include a pointing device) and a reflective display 50 located on the lid body member 7.

A light source 250, preferably a laser light source, provides light 257 that represents information to be displayed or conveyed to the user. The light 257 from light source 250 is directed to a reflection device 253. Light 259 from the reflection device 253 is reflected at an angle through a window portion (not shown) to pop-up reflection device 267 that includes a reflection member 269. The pop-up reflection device 267 is a simple device that is located between an edge of the main body member 1 and the keyboard. It simply pops up when the lid body member 7 is opened and the portable personal computing device is operational. The user can engage the pop-up reflection device 267 manually, or the portable personal computing device upon power-up can position the pop-up reflection device 267 automatically.

The reflected light 259 from reflection device 253 is reflected at angle so that the reflected light 259 will not interfere with the user's hands during manipulation of the keyboard nor be affected by parallax. From pop-up reflection device 267, light 261 is directed to a reflective display device 50 when the lid body member 7 is in an upright or first position. Light 263 is reflected from reflective display device 50, when the lid body member 7 is in an upright or first position, so that the user can perceive the information. If the lid body member 7 is not in an upright or first position, but has been rotated further (273) to a fully open position or second position so that the lid body member 7 is substantially co-planar with the main body member 1; light 261 from pop-up reflection device 267 can be projected onto a wall or screen at a location remote from the portable personal computing device.

Light 257 from the light source 250 may be simple modulated light without any subscanning or main scanning deflection properties. If light 257 from the light source 250 is simple modulated light without any subscanning or main scanning deflection properties, the reflection device 253 may provide subscanning deflection properties to light 257 through either a rotating polygon mirror, a galvanometer mirror, or an optical MEMS device such that light 259 becomes subscanned modulated light. Thereafter, pop-up reflection device 267 provides main scanning deflection properties to light 259 through either a galvanometer mirror or an optical MEMS device such that light 261 becomes two-dimensionally scanned modulated light. It is noted that the subscanning and main scanning deflection properties can be applied in either order.

On the other hand, if light 257 from the light source 250 is simple modulated light without any subscanning or main scanning deflection properties, the reflection device 253 may provide both subscanning and main scanning deflection properties to light 257 through an optical MEMS device such that light 259 becomes two-dimensionally scanned modulated light. Thereafter, pop-up reflection device 267 provides simple reflection and possibly vertical shifting of the two-dimensionally scanned modulated light 259.

Furthermore, if light 257 from the light source 250 is simple modulated light without any subscanning or main scanning deflection properties, the reflection device 253 may provide simple reflection of the simple modulated light 257 to pop-up reflection device 267. Thereafter, pop-up reflection device 267 provides both subscanning and main scanning deflection properties to light 259 through an optical MEMS device such that light 261 becomes two-dimensionally scanned modulated light.

In summary, a fully integrated portable personal computing device includes a lid body member; a main body member; an input system to input data and commands being located in the main body member; a microprocessor being located in the main body member; a display system to display information being located in the lid body member; and a projection system for projecting the information displayed on the display system to an area remote of the portable personal computing device. The projection system may a light source, a subscan deflection system, and a main scan deflection system. The light source may be a laser or a group comprising a red laser light source, green laser light source, and a blue laser light source.

The subscan deflection system may be a rotating polygonal mirror or conventional optical MEMS, and the main scan deflection system may be a galvanometer mirror or conventional optical MEMS. The projection system may further include a vertical shift system and a horizontal shift system. The vertical shift system may be a galvanometer mirror or conventional optical MEMS, and the horizontal shift system may be a manual tiltable mirror. Lastly, the projection system may include a focusing device.

In another embodiment, the present invention is a plug-in device for a portable personal computing device having an integrated display system that includes a projection system for projecting the information displayed on the integrated display system to an area remote of the portable personal computing device. The projection system includes a light source, a subscan deflection system, and a main scan deflection system.

In a further embodiment of the present invention, a portable personal computing device includes a lid body member; a main body member; an input system to input data and commands; a microprocessor; a reflective display system to display information; and a projection system for projecting information onto the reflective display system when the lid body member is in a first position and for projecting information to an area remote of the portable personal computing device when the lid body member is in a second position.

The portable personal computing device may further include a light source to generate light representative of the information to be displayed; a reflection device to reflect light from the light source; and a pop-up reflection device to reflect light received from the reflection device to the reflective display system when the lid body member is in the first position and to reflect light from the reflection device to an area remote of the portable personal computing device when the lid body member is in the second position. Any one of the various reflection devices may provide either sub-scanning deflection of the light or main scanning deflection of the light or both. A rotating polygonal mirror, a galvanometer mirror, or an optical micro electromechanical system may provide subscanning deflection; whereas, a galvanometer mirror or an optical micro electromechanical system may provide main scanning deflection.

The light source may be a laser or a red laser light source, green laser light source, and a blue laser light source. Furthermore, a bundle of fiber optics may be included for directing the light from the light source to any of the various reflection devices. A window portion is located in the main body member to enable light reflected from the reflection device to be transmitted to the pop-up reflection device.

Lastly, the projection system may include a light source and a two-dimensional deflection system to two-dimensionally reflect light from the light source to the reflective display system when the lid body member is in the first position and to two-dimensionally reflect light from the light source to an area remote of the portable personal computing device when the lid body member is in the second position. The two-dimensional deflection system may include a first optical micro electromechanical system corresponding to a red laser light source; a second optical micro electromechanical system corresponding to a blue laser light source; and a third optical micro electromechanical system corresponding to a green laser light source.

While various examples and embodiments of the present invention have been shown and described, it will be appreciated by those skilled in the art that the spirit and scope of the present invention are not limited to the specific description and drawings herein, but extend to various modifications and changes all as set forth in the following claims.

What is claimed is:

1. A fully integrated portable personal computing device, comprising:
    a main body member;
        a lid body member, mechanically connected to said main body member;
        an input system to input data and commands;
        a microprocessor;
        a display system, integrated with said lid body member and being located on a first side of said lid body member, to display observable information; and
        a projection system to project information to an area remote of the portable personal computing device, said information projected by said projection system being said observable information being displayed on said display system, said information being projected simultaneously as said observable information is being displayed;
        said lid body member including a window portion, said window portion being located on a second side of said lid body member;
        said information being projected by said projection system being projected from said lid body member through said window portion of said lid body portion;
        said projection system including a light source, a subscan deflection system, and a main scan deflection system.

2. The portable personal computing device as claimed in claim 1, wherein said subscan deflection system includes a rotating polygonal mirror.

3. The portable personal computing device as claimed in claim 1, wherein said main scan deflection system includes a galvanometer mirror.

4. The portable personal computing device as claimed in claim 1, wherein said main scan deflection system includes an optical micro electromechanical system.

5. The portable personal computing device as claimed in claim 1, wherein said subscan deflection system includes a rotating polygonal mirror and said main scan deflection system includes a galvanometer mirror.

6. The portable personal computing device as claimed in claim 1, wherein said subscan deflection system includes a rotating polygonal mirror and said main scan deflection system includes an optical micro electromechanical system.

7. The portable personal computing device as claimed in claim 1, wherein said projection system includes a focusing device.

8. The portable personal computing device as claimed in claim 1, wherein said light source comprises a red laser light source, green laser light source, and a blue laser light source.

9. The portable personal computing device as claimed in claim 8, further comprising a bundle of fiber optics for directing the light from said light source to said subscan deflection system.

10. A fully integrated portable personal computing device, comprising:
    a main body member;
        a lid body member, mechanically connected to said main body member;
        an input system to input data and commands;
        a microprocessor;
        a display system integrated with said lid body member and being located on a first side of said lid body member, to display observable information; and
        a projection system to project information to an area remote of the portable personal computing device, said information projected by said projection system being said observable information being displayed on said display system, said information being projected simultaneously as said observable information is being displayed;
        said lid body member including a window portion, said window portion being located on a second side of said lid body member;
        said information being projected by said projection system being projected from said lid body member through said window portion of said lid body portion;
        said projection system including a light source, a subscan deflection system, a main scan deflection system, and a vertical shift system.

11. The portable personal computing device as claimed in claim 10, wherein said subscan deflection system includes a rotating polygonal mirror.

12. The portable personal computing device as claimed in claim 10, wherein said main scan deflection system includes a galvanometer mirror.

13. The portable personal computing device as claimed in claim 10, wherein said main scan deflection system includes an optical micro electromechanical system.

14. The portable personal computing device as claimed in claim 10, wherein said vertical shift system includes a galvanometer mirror.

15. The portable personal computing device as claimed in claim 10, wherein said main scan deflection system and said vertical shift system are an optical micro electromechanical system.

16. The portable personal computing device as claimed in claim 10, wherein said subscan deflection system includes a rotating polygonal mirror, said main scan deflection system includes a galvanometer mirror, and said vertical shift system includes a galvanometer mirror.

17. The portable personal computing device as claimed in claim 10, wherein said subscan deflection system includes a rotating polygonal mirror, said main scan deflection system includes an optical micro electromechanical system, and said vertical shift system includes a galvanometer mirror.

18. The portable personal computing device as claimed in claim 10, wherein said subscan deflection system includes a rotating polygonal mirror and said main scan deflection system and said vertical shift system are an optical micro electromechanical system.

19. A fully integrated portable personal computing device, comprising:
- a main body member;
  - a lid body member, mechanically connected to said main body member:
  - an input system to input data and commands;
  - a microprocessor;
  - a display system, integrated with said lid body member and being located on a first side of said lid body member, to display observable information; and
  - a projection system to project information to an area remote of the portable personal computing device, said information projected by said projection system being said observable information being displayed on said display system, said information being projected simultaneously as said observable information is being displayed;
  - said lid body member including a window portion, said window portion being located on a second side of said lid body member;
  - said information being projected by said projection system being projected from said lid body member through said window portion of said lid body portion;
  - said projection system including a light source, a subscan deflection system, a main scan deflection system, a vertical shift system, and a horizontal shift system.

20. The portable personal computing device as claimed in claim 19, wherein said subscan deflection system includes a rotating polygonal mirror.

21. The portable personal computing device as claimed in claim 19, wherein said main scan deflection system includes a galvanometer mirror.

22. The portable personal computing device as claimed in claim 19, wherein said main scan deflection system includes an optical micro electromechanical system.

23. The portable personal computing device as claimed in claim 19, wherein said vertical shift system includes a galvanometer mirror.

24. The portable personal computing device as claimed in claim 19, wherein said main scan deflection system and said vertical shift system are an optical micro electromechanical system.

25. The portable personal computing device as claimed in claim 19, wherein said horizontal shift system includes a manual tiltable mirror.

26. The portable personal computing device as claimed in claim 19, wherein said subscan deflection system includes a rotating polygonal mirror, said main scan deflection system includes a galvanometer mirror, said horizontal shift system includes a manual tiltable mirror, and said vertical shift system includes a galvanometer mirror.

27. The portable personal computing device as claimed in claim 19, wherein said subscan deflection system includes a rotating polygonal mirror, said main scan deflection system includes an optical micro electromechanical system, said horizontal shift system includes a manual tiltable mirror, and said vertical shift system includes a galvanometer mirror.

28. The portable personal computing device as claimed in claim 19, wherein said subscan deflection system includes a rotating polygonal mirror, said main scan deflection system and said vertical shift system are an optical micro electromechanical system, and said horizontal shift system includes a manual tiltable mirror.

29. The portable personal computing device as claimed in claim 19, wherein said projection system includes a focusing device.

30. The portable personal computing device as claimed in claim 29, wherein said focusing device is located between said vertical shift system and said horizontal shift system.

31. A fully integrated portable personal computing device, comprising:
- a main body member;
  - said main body member including,
    - an input system to input data and commands,
    - a microprocessor, and
    - a display system to display observable information;
  - a projection system to project information to an area remote of the portable personal computing device, said information projected by said projection system being said observable information being displayed on said display system, said information being projected simultaneously as said observable information is being displayed; and
  - a lid body member;
  - said projection system projecting the information from said main body member through said lid body member;
  - said lid body member including a window portion and a focusing device;
  - said projection system projecting the information from said main body member from said lid body member through said window portion;
  - said projection system including a light source, and a two-dimensional deflection system.

32. The portable personal computing device as claimed in claim 31, wherein said light source comprises a red laser light source, green laser light source, and a blue laser light source.

33. The portable personal computing device as claimed in claim 32, wherein said two-dimensional deflection system includes:
- a first optical micro electromechanical system corresponding to said red laser light source;
- a second optical micro electromechanical system corresponding to said blue laser light source; and
- a third optical micro electromechanical system corresponding to said green laser light source.

34. The portable personal computing device as claimed in claim 32, wherein said two-dimensional deflection system includes an optical micro electromechanical system.

35. A fully integrated portable personal computing device, comprising:
- a lid body member;

said lid body member including a reflective display device to display information;
a main body member mechanically connected to said lid body member;
an input system to input data and commands;
a microprocessor;
a projection system to project information onto said reflective display device when said lid body member is mechanically connected to said main body and is in a first position and to project information to an area remote of the portable personal computing device when said lid body member is mechanically connected to said main body and is in a second position;
said projection system including a light source to generate light representative of the information to be displayed and a pop-up reflection device to reflect light from said light source to said reflective display system when said lid body member is in said first position and to reflect light from said light source to an area remote of the portable personal computing device when said lid body member is in said second position.

36. The portable personal computing device as claimed in claim 35, further comprising:
a light source to generate light representative of the information to be displayed;
a reflection device to reflect light from said light source; and
a pop-up reflection device to reflect light received from said reflection device to said reflective display system when said lid body member is in said first position and to reflect light from said reflection device to an area remote of the portable personal computing device when said lid body member is in said second position.

37. The portable personal computing device as claimed in claim 35, wherein said projection system includes a focusing device.

38. The portable personal computing device as claimed in claim 35, wherein said light source is a laser.

39. The portable personal computing device as claimed in claim 35, wherein said light source comprises a red laser light source, green laser light source, and a blue laser light source.

40. The portable personal computing device as claimed in claim 36, wherein said reflection device provides subscanning deflection of the light and said pop-up reflection device provides main scanning deflection of the light.

41. The portable personal computing device as claimed in claim 36, wherein said light source provides subscanning projection of the light and said reflection device provides main scanning deflection of the light.

42. The portable personal computing device as claimed in claim 41, wherein said pop-up reflection device includes a galvanometer mirror.

43. The portable personal computing device as claimed in claim 41, wherein said pop-up reflection device includes an optical micro electromechanical system.

44. The portable personal computing device as claimed in claim 36, wherein said light source is a laser.

45. The portable personal computing device as claimed in claim 36, wherein said light source comprises a red laser light source, green laser light source, and a blue laser light source.

46. The portable personal computing device as claimed in claim 36, further comprising a bundle of fiber optics for directing the light from said light source to said reflection device.

47. The portable personal computing device as claimed in claim 36, further comprising:
a window portion in said main body member to enable light reflected from said reflection device to be transmitted to said pop-up reflection device.

48. The portable personal computing device as claimed in claim 40, wherein said reflection device includes a rotating polygonal mirror.

49. The portable personal computing device as claimed in claim 40, wherein said reflection device includes a galvanometer mirror.

50. The portable personal computing device as claimed in claim 49, wherein said pop-up reflection device includes a galvanometer mirror.

51. The portable personal computing device as claimed in claim 49, wherein said pop-up reflection device includes an optical micro electromechanical system.

52. The portable personal computing device as claimed in claim 40, wherein said reflection device includes an optical micro electromechanical system.

53. The portable personal computing device as claimed in claim 52, wherein said pop-up reflection device includes a galvanometer mirror.

54. The portable personal computing device as claimed in claim 52, wherein said pop-up reflection device includes an optical micro electromechanical system.

55. The portable personal computing device as claimed in claim 40, wherein said pop-up reflection device includes a galvanometer mirror.

56. The portable personal computing device as claimed in claim 40, wherein said pop-up reflection device includes an optical micro electromechanical system.

57. The portable personal computing device as claimed in claim 48, wherein said pop-up reflection device includes a galvanometer mirror.

58. The portable personal computing device as claimed in claim 48, wherein said pop-up reflection device includes an optical micro electromechanical system.

59. A fully integrated portable personal computing device, comprising:
a lid body member;
said lid body member including a reflective display device to display information;
a main body member mechanically connected to said lid body member;
an input system to input data and commands;
a microprocessor;
a projection system to project information onto said reflective display device when said lid body member is mechanically connected to said main body and is in a first position and to project information to an area remote of the portable personal computing device when said lid body member is mechanically connected to said main body and is in a second position;
said projection system including a light source, and a two-dimensional deflection system to two-dimensionally reflect light from said light source to said reflective display system when said lid body member is in said first position and to two-dimensionally reflect light from said light source to an area remote of the portable personal computing device when said lid body member is in said second position.

60. The portable personal computing device as claimed in claim 59, wherein said light source comprises a red laser light source, green laser light source, and a blue laser light source.

61. The portable personal computing device as claimed in claim 60, wherein said two-dimensional deflection system includes:
- a first optical micro electromechanical system corresponding to said red laser light source;
- a second optical micro electromechanical system corresponding to said blue laser light source; and
- a third optical micro electromechanical system corresponding to said green laser light source.

62. The portable personal computing device as claimed in claim 59, wherein said two-dimensional deflection system includes an optical micro electromechanical system.

63. A compact integral plug-in device for a portable personal computing device having an integrated display system, the integrated display system displaying observable information, comprising:
- a projection system to project the observable information being displayed on the integrated display system to an area remote of the portable personal computing device;
- said projection system including,
    - a housing,
    - a port, integral with said housing, to provide a rigid connection between said housing of said projection system and the portable personal computing device and to provide a communication interface directly with the portable personal computing device having the integrated display system,
    - a light source,
    - a subscan deflection system, and
    - a main scan deflection system;
- said projection system projecting the observable information being displayed on the integrated display system simultaneously as the observable information is being displayed on the integrated display system.

64. The plug-in device as claimed in claim 63, wherein said subscan deflection system includes a rotating polygonal mirror.

65. The plug-in device as claimed in claim 63, wherein said main scan deflection system includes a galvanometer mirror.

66. The plug-in device as claimed in claim 63, wherein said main scan deflection system includes an optical micro electromechanical system.

67. The plug-in device as claimed in claim 63, wherein said subscan deflection system includes a rotating polygonal mirror and said main scan deflection system includes a galvanometer mirror.

68. The plug-in device as claimed in claim 63, wherein said subscan deflection system includes a rotating polygonal mirror and said main scan deflection system includes an optical micro electromechanical system.

69. The plug-in device as claimed in claim 63, wherein said projection system further includes a vertical shift system.

70. The plug-in device as claimed in claim 69, wherein said vertical shift system includes a galvanometer mirror.

71. The plug-in device as claimed in claim 69, wherein said main scan deflection system and said vertical shift system are an optical micro electromechanical system.

72. The plug-in device as claimed in claim 69, wherein said subscan deflection system includes a rotating polygonal mirror, said main scan deflection system includes a galvanometer mirror, and said vertical shift system includes a galvanometer mirror.

73. The plug-in device as claimed in claim 69, wherein said subscan deflection system includes a rotating polygonal mirror, said main scan deflection system includes an optical micro electromechanical system, and said vertical shift system includes a galvanometer mirror.

74. The plug-in device as claimed in claim 69, wherein said subscan deflection system includes a rotating polygonal mirror and said main scan deflection system and said vertical shift system are an optical micro electromechanical system.

75. The plug-in device as claimed in claim 63, wherein said projection system includes a focusing device.

76. The plug-in device as claimed in claim 63, wherein said light source is a laser.

77. The plug-in device as claimed in claim 63, wherein said light source comprises a red laser light source, green laser light source, and a blue laser light source.

78. The plug-in device as claimed in claim 63, wherein said port interfaces directly with a parallel port of the portable personal computing device with the integrated display system.

79. The plug-in device as claimed in claim 63, wherein said port interfaces directly with a serial port of the portable personal computing device with the integrated display system.

80. The plug-in device as claimed in claim 63, wherein said port interfaces directly with a display port of the portable personal computing device with the integrated display system.

81. The device as claimed in claim 63, wherein said port interfaces directly with a game port of the portable personal computing device with the integrated display system.

82. The plug-in device as claimed in claim 63, wherein said port interfaces directly with a universal serial bus port of the portable personal computing device with the integrated display system.

83. The plug-in device as claimed in claim 63, wherein said port interfaces directly with a PS/1 port of the portable personal computing device with the integrated display system.

84. The plug-in device as claimed in claim 63, wherein said port interfaces directly with a 10BaseT/100BaseTX RJ-45 port of the portable personal computing device with the integrated display system.

85. The plug-in device as claimed in claim 63, wherein said port interfaces directly with a RJ11/14 port of the portable personal computing device with the integrated display system.

86. The plug-in device as claimed in claim 63, wherein said port interfaces directly with a video RCA port of the portable personal computing device with the integrated display system.

87. The plug-in device as claimed in claim 63, wherein said port interfaces directly with a video/audio RCA port of the portable personal computing device with the integrated display system.

88. A compact integral plug-in device for a portable personal computing device having an integrated display system, the integrated display system displaying observable information, comprising:
- a projection system to project the observable information being displayed on the integrated display system to an area remote of the portable personal computing device;
- said projection system including,
    - a housing,
    - a port, integral with said housing, to provide a rigid connection between said housing of said projection system and the portable personal computing device and to provide a communication interface directly with the portable personal computing device having the integrated display system, a light source, and an optical micro electromechanical system to provide two-dimensional deflection;

said projection system projecting the observable information being displayed on the integrated display system simultaneously as the observable information is being displayed on the integrated display system.

89. The plug-in device as claimed in claim 88, wherein said light source comprises a red laser light source, green laser light source, and a blue laser light source.

90. The plug-in device as claimed in claim 89, wherein said optical micro electromechanical system includes:

a first optical micro electromechanical system corresponding to said red laser light source;

a second optical micro electromechanical system corresponding to said blue laser light source; and a third optical micro electromechanical system corresponding to said green laser light source.

91. The plug-in device as claimed in claim 89, wherein said port interfaces directly with a parallel port of the portable personal computing device with the integrated display system.

92. The plug-in device as claimed in claim 89, wherein said port interfaces directly with a serial port of the portable personal computing device with the integrated display system.

93. The plug-in device as claimed in claim 89, wherein said port interfaces directly with a display port of the portable personal computing device with the integrated display system.

94. The plug-in device as claimed in claim 89, wherein said port interfaces directly with a game port of the portable personal computing device with the integrated display system.

95. The plug-in device as claimed in claim 89, wherein said port interfaces directly with a universal serial bus port of the portable personal computing device with the integrated display system.

96. The plug-in device as claimed in claim 89, wherein said port interfaces directly with a PS/1 port of the portable personal computing device with the integrated display system.

97. The plug-in device as claimed in claim 89, wherein said port interfaces directly with a 10BaseT/100BaseTX RJ-45 port of the portable personal computing device with the integrated display system.

98. The plug-in device as claimed in claim 89, wherein said port interfaces directly with a RJ11/14 port of the portable personal computing device with the integrated display system.

99. The plug-in device as claimed in claim 89, wherein said port interfaces directly with a video RCA port of the portable personal computing device with the integrated display system.

100. The plug-in device as claimed in claim 89, wherein said port interfaces directly with a video/audio RCA port of the portable personal computing device with the integrated display system.

* * * * *